United States Patent [19]
Reiker

[11] Patent Number: 5,661,264
[45] Date of Patent: Aug. 26, 1997

[54] LOAD SUPPORTING ELECTRICAL BOX SYSTEM SUITED FOR INSTALLATION IN CONCRETE

[76] Inventor: Kenneth H. Reiker, 4106 P.O. Box, Shalimar, Fla. 32579

[21] Appl. No.: 381,434

[22] Filed: Jan. 31, 1995

[51] Int. Cl.⁶ .................................................. H02G 3/08
[52] U.S. Cl. .................................... 174/50; 248/906
[58] Field of Search ........................... 174/50, 54, 57, 174/58, 63, 48; 220/3.4, 3.5, 3.6, 3.9, 3.92, 3.94, 4.02; 52/220.8; 248/906, 903, 323, 326, 343, 205.4, 217.3

[56] References Cited

U.S. PATENT DOCUMENTS

| | | | |
|---|---|---|---|
| Re. 33,147 | 1/1990 | Reiker | 248/200.1 |
| Re. 34,603 | 5/1994 | Caison et al. | 174/54 |
| D. 288,289 | 2/1987 | Reiker | D8/380 |
| 1,066,706 | 7/1913 | Caine . | |
| 1,592,990 | 7/1926 | Raquette et al. . | |
| 1,824,708 | 9/1931 | Davis et al. . | |
| 2,031,689 | 2/1936 | Buckels | 247/21 |
| 2,305,015 | 12/1942 | Langer | 248/343 X |
| 2,313,131 | 3/1943 | Elias | 248/343 X |
| 2,471,301 | 5/1949 | Boosey | 52/220.8 |
| 2,983,399 | 5/1961 | Slater et al. | 220/3.4 |
| 3,472,945 | 10/1969 | Trachtenberg | 174/53 |
| 3,620,404 | 11/1971 | Grasso | 174/57 X |
| 3,622,029 | 11/1971 | Ware | 174/57 X |
| 3,877,601 | 4/1975 | Evans et al. | 220/3.3 |
| 4,037,098 | 7/1977 | Kowalski | 248/323 X |
| 4,176,758 | 12/1979 | Glick | 174/58 X |
| 4,180,226 | 12/1979 | Matte | 248/27.1 |
| 4,331,832 | 5/1982 | Curtis et al. | 174/57 |
| 4,433,204 | 2/1984 | Wuertz | 174/53 X |
| 4,463,923 | 8/1984 | Reiker | 248/546 |
| 4,642,956 | 2/1987 | Harbeke | 52/220.8 X |
| 4,684,092 | 8/1987 | Reiker | 248/200.1 |
| 5,239,132 | 8/1993 | Bartow | 174/58 |
| 5,303,894 | 4/1994 | Deschamps et al. | 248/343 |
| 5,451,081 | 9/1995 | Kaucnik | 52/220.8 X |

FOREIGN PATENT DOCUMENTS

3403053  8/1985  Germany .................. 174/58 X

Primary Examiner—Hyung S. Sough
Assistant Examiner—Dean A. Reichard
Attorney, Agent, or Firm—Shlesinger, Arkwright & Garvey LLP

[57] ABSTRACT

In one embodiment of the invention, the electrical fixture mounting assembly includes a junction box having a junction box cavity defined therein, and a mounting bracket disposed on the junction box. There is a fastener attachment site on the mounting bracket along with a fastener disposed thereon. The fastener is moveable between an extended position and a retracted position. The fastener is sufficiently long so that it extends outwardly of the junction box cavity when the fastener is in its extended position, and the fastener is contained substantially within the junction box cavity when the fastener is in its retracted position. There is likewise disclosed a method of installing an electrical fixture mounting assembly.

30 Claims, 9 Drawing Sheets

LOAD SUPPORTING ELECTRICAL BOX SYSTEM SUITED FOR INSTALLATION IN CONCRETE

FIELD OF THE INVENTION

This invention relates to a fixture mounting assembly and a junction box for installation in a wall, floor, or ceiling. In particular, the invention is directed to an electrical box particularly suited for use in concrete and the like.

BACKGROUND OF THE INVENTION

Junction boxes have long been used for making electrical connections in walls and ceilings. There have even been prior designs for placing an electrical outlet box in concrete, for example.

Conventional junctions boxes, however, are typically unsuitable for carrying loads, for being cast directly in concrete, are costly to fabricate, and often have structural features which reduce the effectiveness and ease of use thereof.

For example, U.S. Pat. No. 2,983,399 to Slater et al. discloses an electrical outlet box having a seal for preventing concrete from entering the slater box, yet the Slater outlet box is useable essentially only as a junction box, and is not designed for carrying heavy, vibrating loads, such as a ceiling fan.

U.S. Pat. No. Re. 34,603 to Caison et al. is of interest for its disclosure of an electrical junction box for support of a hanging appliance. The Caison et al. device discloses the use of square neck carriage bolts nonrotatably press fitted in the structure for carrying loads. However, loads are carried by the Caison et al. box itself, which hinders the ability of that box to carry relatively large and/or dynamic loads.

U.S. Pat. No. 1,824,708 to Davis et al. illustrates an electrical fixture and fan support which includes a bracket having a depression extending into the interior of the Davis et al. outlet box. The bracket is connected to the Davis et al. box as well as to an exterior header plate by stove bolts. Davis et al. states that a hanger bolt will be secured to the electrical fixture prior to its installation and then the worker will hoist it into position and slide the head of the hanger bolt into a head entrance and drop the hanger bolt down until it rests in a recess of the bracket. Although Davis et al. envisioned providing an extra pair of arms (Davis et al. FIG. 6) for carrying the added weight of a ceiling fan, the weight of a fixture, such a ceiling fan, will be transmitted through the single Davis et al. hanger bolt, and then through a number of screws. The reliability of the Davis et al. device is thus dependent on the individual and collective resistance to failure of a plurality of fasteners.

U.S. Pat. No. Re. 33,147 to Reiker is one of my earlier patents for a ceiling fan mounting assembly which works well and meets its intended purpose of resisting high loads and high torques. However, there is still a need for a junction box which is particularly suited for use in materials such as concrete.

OBJECTS AND SUMMARY OF THE INVENTION

Accordingly, it is an object of the invention to provide an electrical junction box which overcomes the drawbacks and disadvantages of the prior art devices.

Another object of the invention is to provide an electrical junction box which is particularly suited for use in walls, floors, and ceilings made of materials such as concrete.

Yet another object of the invention is to provide a junction box which can be inexpensively manufactured.

A still further object of the invention is to provide a junction box which is engineered so that large static and dynamic loads are transferred directly to the medium in which the junction box is installed, as opposed to the junction box itself.

A further object of the invention is to provide a junction box which has multiple spaces therein for accommodating different types of wires and cables concurrently.

A further object of the invention is to provide an electrical junction box which is more resistant to oxidation and rusting than earlier devices.

It is yet another object of the invention to provide a junction box which causes the strength of substrate in which it is installed (such as a floor, wall, or ceiling) to be utilized for carrying the load of a fixture attached at/to the junction box site.

A yet further object of the invention is to provide a junction box which is easier and faster to install and use than conventional boxes.

Another object of the invention is to provide a junction box providing an attachment site to which fixtures can be more readily attached than with conventional boxes.

Yet another object of the invention is to provide an electrical fixture mounting assembly having a junction box which prevents the introduction of concrete and/or water into the junction box cavity during installation thereof.

Another object of the invention is to provide a junction box in which additional space for communication lines is provided.

A further object of the invention is to provide an electrical fixture mounting assembly which carries the load of a fixture, and is retained in concrete without exerting forces applied by the fixture on an associated junction box.

Another object of the invention is to provide a bracket for retrofitting a conventional concrete junction box for eliminating the problem of forces applied by an associated mounted fixture being transferred to the junction box.

In summary, therefore, the invention is directed to an electrical fixture mounting assembly which is strong, easily and speedily used, and which overcomes the drawbacks of the prior art devices.

In another preferred embodiment of the invention a bracket extends outwardly of a junction box, and is configured for engaging concrete and transferring forces thereto. The bracket is configured for transferring forces from a mounted fixture substantially directly to the concrete in which it is installed.

In one preferred embodiment of the invention, the electrical fixture mounting assembly includes a junction box having a junction box cavity defined therein, and a mounting bracket disposed on the junction box. There is a fastener attachment site on the mounting bracket along with a fastener disposed thereon. The fastener is moveable between an extended position and a retracted position. The fastener is sufficiently long so that it extends outwardly of the junction box cavity when the fastener is in its extended position, and the fastener is contained substantially within the junction box cavity when the fastener is in its retracted position.

In a preferred embodiment of a method according to the invention it is provided that when installing an electrical fixture mounting assembly in concrete, said method includes providing a junction box having atop, a bottom, a sidewall extending therebetween, and a junction box cavity therein.

There is a further step of providing a mounting bracket having a fastener attachment site thereon, and providing a fastener disposed on said fastener attachment site, said fastener being movable between an extended position and a retracted position, said fastener being sufficiently long to extend outwardly of said junction box cavity when said fastener is in said extended position, and said fastener being contained substantially within said junction box cavity when said fastener is in said retracted position. A still further step includes placing said fastener in its retracted position and pouring concrete around said junction box.

BRIEF DESCRIPTION OF THE DRAWINGS

FIG. 13 is a perspective view of a clip which may be used with the preferred embodiment of the electrical fixture mounting assembly of FIG. 11;

FIG. 16a is a partially sectioned elevational view of yet another preferred embodiment of an electrical fixture mounting assembly according to the invention;

FIG. 16b is a perspective view of a bracket for use with the preferred embodiment of FIG. 16a;

FIG. 18b is a perspective view of a bracket for use with the preferred embodiment of FIG. 18a;

FIG. 19b is an exploded, perspective view of two halves of the preferred embodiment of the electrical fixture mounting assembly of FIG. 19a.

DETAILED DESCRIPTION OF THE INVENTION

FIGS. 1–6 illustrate a first preferred embodiment of an electrical fixture mounting assembly 10 having a junction box 14, according to a first preferred embodiment of the invention.

Figures 1, 2:
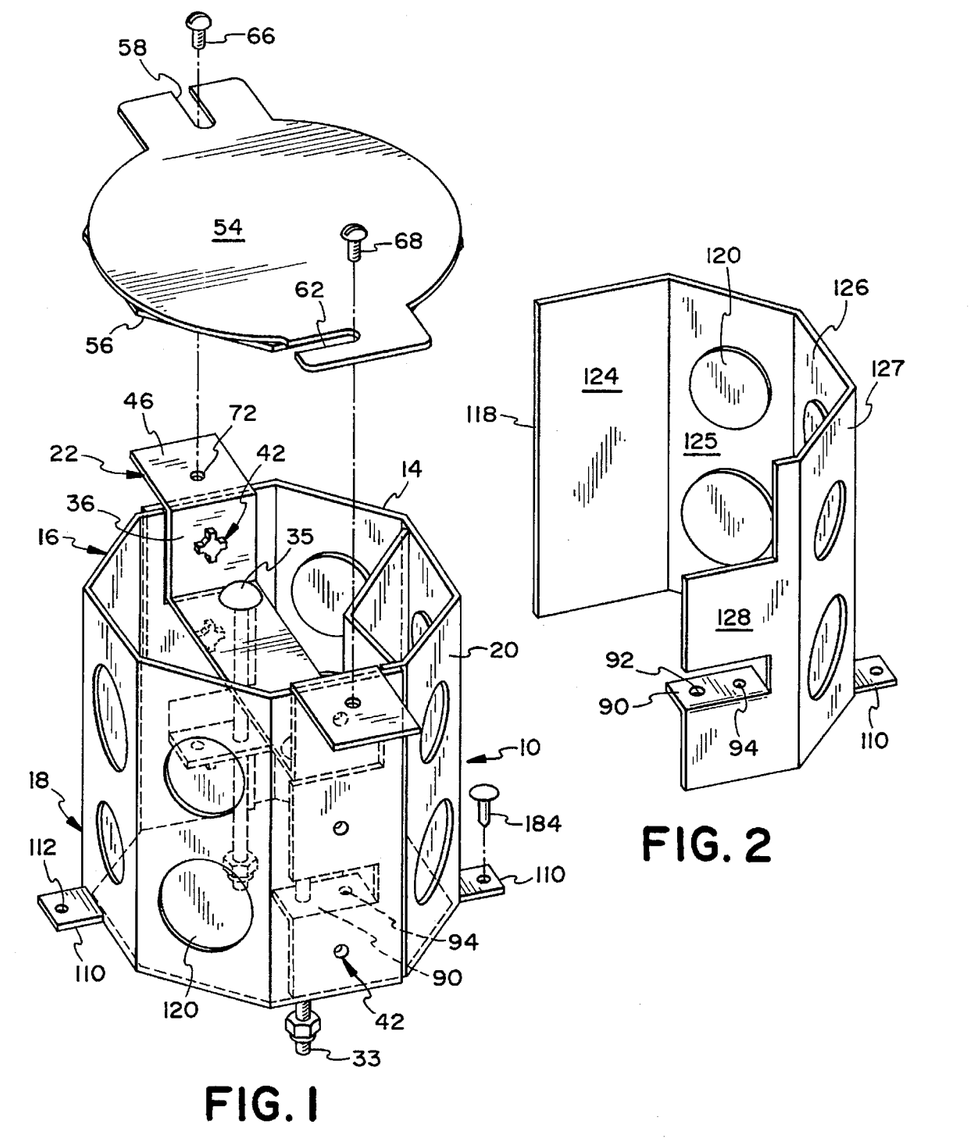
FIG. 1 is an exploded perspective view of a first preferred embodiment of an electrical fixture mounting assembly according to the invention.
FIG. 2 is a perspective view of a portion of the sidewall of the junction box of the preferred embodiment of FIG. 1.

Junction box 14 includes a top 16 and a bottom 18.

The terms "electrical fixture mounting assembly", "junction box", "top" and "bottom", as well as other relative terms used throughout the specification, are for convenience only and are not intended to be limiting.

Junction box 14 includes a side wall 20 and defines a junction cavity 21. Junction cavity 21 is sized for receiving and joining electrical wires, conduit, cable connections, fiberoptics, and other telecommunication linkages, as will be described in greater detail below.

A mounting bracket 22 is disposed adjacent the top of junction box 14 and is disposed and configured for transferring the weight and vibration of electrical figures, for example, directly to the substrate in which electrical fixture mounting assembly 10 is disposed, as opposed to transferring the weight of mounted fixtures to junction box 14, as is often the case in prior art devices.

A fastener attachment site 26 is provided on a transverse support 30 of mounting bracket 22.

A first vertical extension 36 and a second vertical extension 38 are preferably provided as part of mounting bracket 22. Vertical extensions 36 and 38 are sized to provide a space or upper subcavity 40 in a volume substantially defined by transverse support 30 and the top 16 of junction box 14.

Good results have been achieved when a weld-free stamped/punched connector 42 joins sidewall 20 to mounting bracket 22. The punched connector 42 provides a secure attachment between components of electrical fixture mounting assembly 10, without disturbing a galvanized coating on the assembly in the case where galvanized sheet metal is used, for example, and without the need for a separate fastener. An oxidation-resistant, rustfree connection is achieved, which is desirable when junction box 14 is cast in concrete, for example, where water moisture may induce rust at unprotected sites.

At least one extension 46, which may extend outwardly from vertical extension 36 of mounting bracket 22 and outwardly of junction box 14, is typically provided. A second extension 48 may likewise be provided.

A lid 54 is configured for mating with top 16 of junction box 14. A foam gasket 56, which may be made of any suitable water-resistant or water-proof material, is provided on a lower side of lid 54 for establishing a seal between lid 54 and sidewall 20 for preventing the introduction of liquid and material into junction box cavity 21, when in use. Foam gasket 56 may be given an octagonal configuration for mating with the octagonal upper open end of junction box 14.

A slot 58 is defined in an outwardly extending tab 60 of lid 54. A further slot 62 is provided in another tab 64, and slot 62 may be provided extending at an angle relative to slot 60 so as to enhance the connection between a fastener 66 and a fastener 68, respectively. A like pair of female connectors 72 and 76, such as threaded holes, are provided in extensions 46 and 48, respectively, of junction box 14.

An inwardly extending auxiliary bracket 90 is provided with a throughhole 92 and a threaded bore 94. A securing tab 96 extending from an inner wall 98 defining a subcavity 100 is attached to auxiliary bracket 90 by use of a fastener 97. Subcavity 100 can be sized for housing communication lines in a portion of junction box cavity 21 separate from the main volume thereof.

A temporary tie down tab 110 having a bore 112 extending therethrough is provided extending outwardly from sidewall 20. Two or more such temporary tie down tabs 110 may be provided.

Conveniently, a ground wire 116 suited for use with electrical devices and hook-ups can be secured to one of auxiliary brackets 90.

A plurality of hock-outs 120 are preferably provided in sidewall 20 as partially cut through bores which are readily removed for receiving conduits and electrical wires, for example, as is well known.

A plurality of subpanels 124, 125, 126, 127, and 128 has been successfully made to collectively define sidewall 20. Two such sidewall halves 118 are secured together by stamped connectors 42. For example, as can be readily appreciated from considering FIGS. 1, 2, and 4 in particular, the respective subpanels 124 of a pair of sidewall halves 118 will be disposed outwardly of a respective pair of subpanels 128 and attached thereto. It is contemplated that the paired sidewall halves be made substantially identical.

Figure 6:
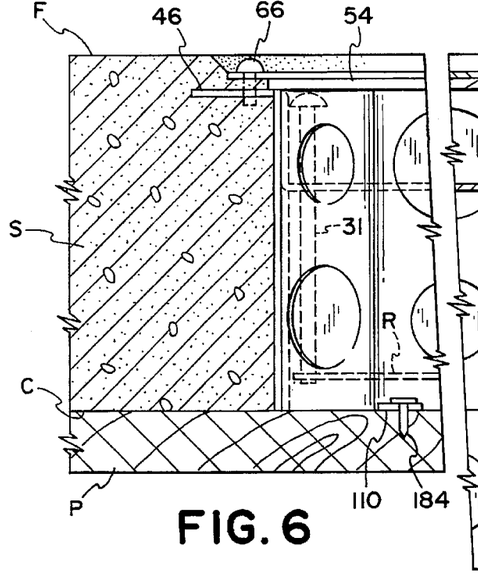
FIG. 6 is a side elevational view partially in section, of the preferred embodiment of the electrical fixture mounting assembly of FIG. 1, when in use.

FIG. 6 illustrates electrical fixture mounting assembly 10 as it is being cast in concrete, for example. The manner in which fixture mounting assembly 10 is secured in such a medium/substrate will be described in greater detail under OPERATION below.

Figure 7:
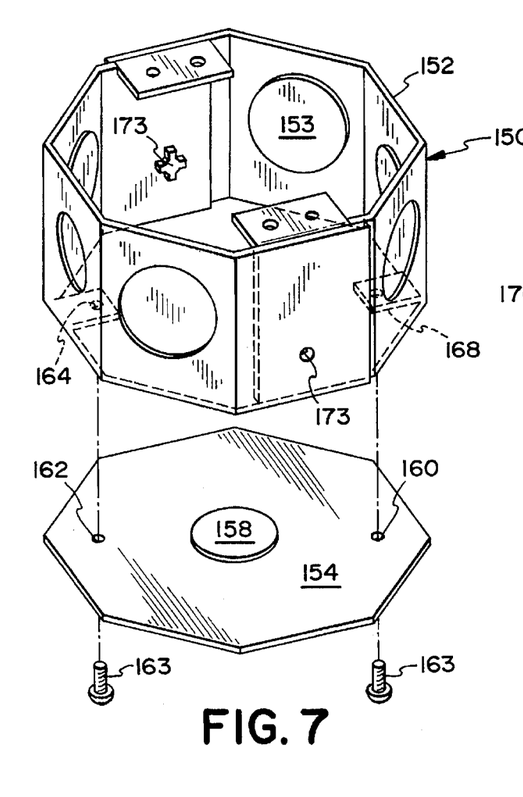
FIG. 7 is an exploded perspective view of an extension box according to a preferred embodiment of my invention.
Figure 8:
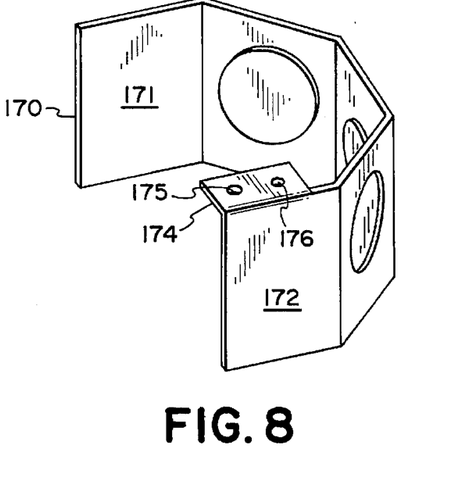
FIG. 8 is a perspective view of one of the side walls of the preferred embodiment of the extension box of FIG. 7.
Figure 9:
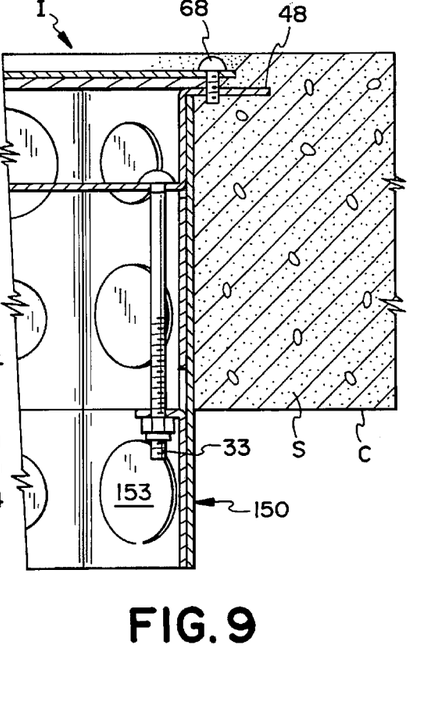
FIG. 9 is a sectional view, similar to FIG. 6, of the preferred embodiment of the electrical fixture mounting assembly of FIG. 1, when in use with the auxiliary box of FIG. 7.

Turning to FIGS. 7–9, auxiliary junction box 150 will be explained.

Auxiliary junction box 150 includes a sidewall 152 and a cover 154. A plurality of knock-outs 158 is provided in any desired manner, depending on the intended use of auxiliary junction box 150. A pair of apertures 160 and 162 extend through cover 154 and are configured for allowing fasteners 163 to extend therethrough and engage with respective ones of threaded bores 164 tapped (or otherwise formed) in inwardly extending tabs 168.

A pair of sidewall halves 170 has successfully been used to form sidewall 152 of auxiliary junction box 150. When constructing auxiliary junction box 150, respective ones of a pair of subpanels 171 are disposed outwardly of a pair of spaced opposed subpanels 172. One or more fasteners 173 join the two sets of paired panels 171 and 172 together.

A fastener guide 174 extends inwardly into the cavity of auxiliary junction box 150. A throughhole 175 and/or a threaded bore 176 is provided so that auxiliary junction box 150 can be detachably attached below junction box 14 as shown in FIG. 9.

Good results have been achieved when fastener guide 174 is positioned on sidewall 172 so that bolt 33 of the length or configuration which ban be disposed entirely within junction box cavity 21 of junction box 14 can be used for securing auxiliary junction box 150 to junction box 14. It is likewise contemplated that other dispositions of fastener guide 174 and/or lengths and sizes of bolts 33 will be used.

Figures 10, 11, 12:
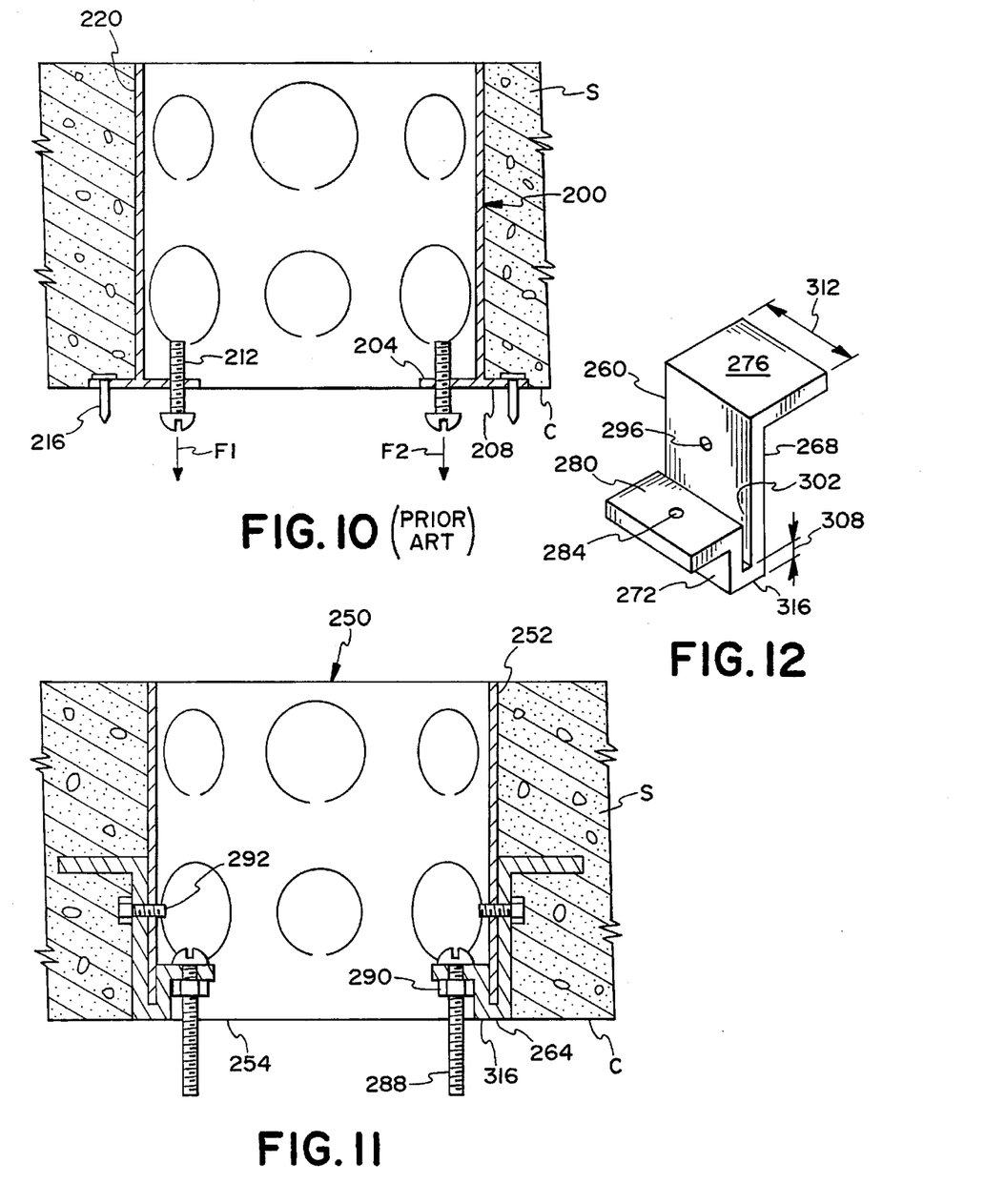
FIG. 10 is a sectional view of a PRIOR ART electrical box for installation in concrete, shown in use.
FIG. 11 is a sectional view of a further preferred embodiment of an electrical fixture, mounting assembly according to the invention.

FIG. 10 illustrates a PRIOR ART concrete box 200 over which the various embodiments of the electrical fixture mounting assembly according to the invention have improved. PRIOR ART box 200 typically includes an inner tab 204 and an outer tab or temporary tie down tab 208. One or more fixture fasteners 212 extend through inner tabs 204 and support an unillustrated fixture. In use, the PRIOR ART concrete box 200 would typically be installed in a substrate S such as concrete. An exterior wall 220 of PRIOR ART box 200 would be surrounded by substrate S and would be at least partially adhered thereto. Thus, when a fixture was attached to box 200 by fasteners 212, forces F1 and F2 exerted by the fixture were exerted on inner tabs 204 and, hence, the remainder of PRIOR ART box 200. It will be appreciated that the adhesion between exterior wall 220 and substrate S, and any frictional resistance developed therebetween, would have provided substantially the only resistance to PRIOR ART box 200 being pulled out of substrate S by forces F1 and F2 exerted by the fixture. The installation of PRIOR ART concrete box 200 is shown in FIG. 10 when box 200 is used in a ceiling C.

Turning to FIGS. 11 and 12, a further preferred embodiment of an electrical fixture mounting assembly 250 according to the invention is shown, along with a clip 260 for use with the assembly 250 of FIG. 11. It is likewise contemplated that clip 260 can serve to retrofit a PRIOR ART box 200 of FIG. 10. Electrical fixture mounting assembly 250 includes an outer wall 252 and a lower edge 254.

Clip 260 includes a base 264, an outer wall 268, and an inner wall 272. An outer extension 276 extends from outer wall 268. Preferably, an inner extension 280 is provided that extends from inner wall 272. A hole 284 may be pre-formed in inner extension 280 for receiving a fixture fastener 288. Conveniently, a lock nut 290 is provided on fixture fastener 288 for preventing rotation thereof when a fixture is being attached to fixture fasteners 288. An optional clip fastener 292 extends through an optional hole 296 provided in outer wall 268 for securing clip 260 to outer wall 252 of assembly 250.

It is likewise contemplated that a gap 302 defined between inner wall 272 and outer wall 268 of bracket 260 will be sized to correspond to the thickness of outer wall 252 of assembly 250 so as to provide frictional engagement therebetween. The width of gap 302 may likewise be sized for engaging exterior wall 220 of PRIOR ART concrete box 200. When clip 260 is used to retrofit a PRIOR-ART concrete box 200, it will be appreciated that box will be elevated by an amount equal to a base thickness 308 of clip 260. When PRIOR ART box 200 is retrofitted with clip 260, a gap between the bottom of box 200 and the supporting member (i.e., the concrete form work such as plywood P shown in FIG. 6) is formed. Depending on the viscosity of the concrete and the size of the gap resulting from base thickness 308, additional steps may need to be-taken to prevent entry of concrete into the interior of retrofitted box 200.

The preferred embodiment of FIG. 11 overcomes any potential problems resulting from the base thickness 308. A portion of outer wall 252 of electrical fixture mounting assembly 250 has been removed to compensate for base thickness 308. Thus, it will be appreciated that a cut out can be formed in the lower portion of outer wall 252 that has a width sufficiently large to receive the width 312 of bracket 260, as well as a height sufficiently tall to accommodate the base thickness 308. In that manner, a bottom face 316 of base 264 will be flush with lower edge 254 of electrical fixture mounting assembly 250. Hence, lower edge 254 and bottom face 316 are aligned, are seated evenly on supporting concrete form work when in use, and are aligned with the surface of ceiling C when installed, as seen in FIG. 11.

Figure 13A:
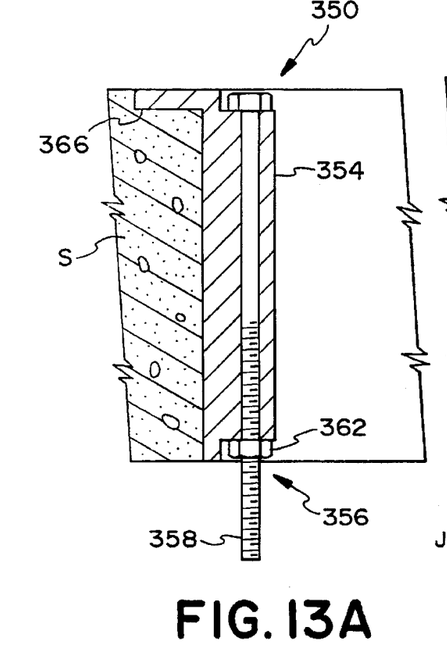
FIG. 13a is a partially sectioned elevational view of a still further preferred embodiment of an electrical fixture mounting assembly according to the invention.

FIG. 13 illustrates a further preferred embodiment of an electrical fixture mounting assembly 350 according to the invention.

Assembly 350 includes a sidewall 354 defining a junction box cavity 356. A fixture fastener 358 extends below junction box cavity 356 for having a fixture attached thereto. As will be readily appreciated a lock nut or other locking means 362 can be used to clamp fixture fasteners 358 relative to wall 354, so that a fixture can be readily attached when electrical fixture mounting assembly 350 is embedded and retained in a substrate, such as concrete. One or more flanges 366 extend outwardly of wall 354. Flanges 366 transfer forces exerted on walls 354 by fixture fastener 358 to the surrounding concrete S, a portion of which is illustrated. It is contemplated that assembly 350 be made of plastic, and fixture fasteners 358 be made of metal, for example.

Figure 13B:
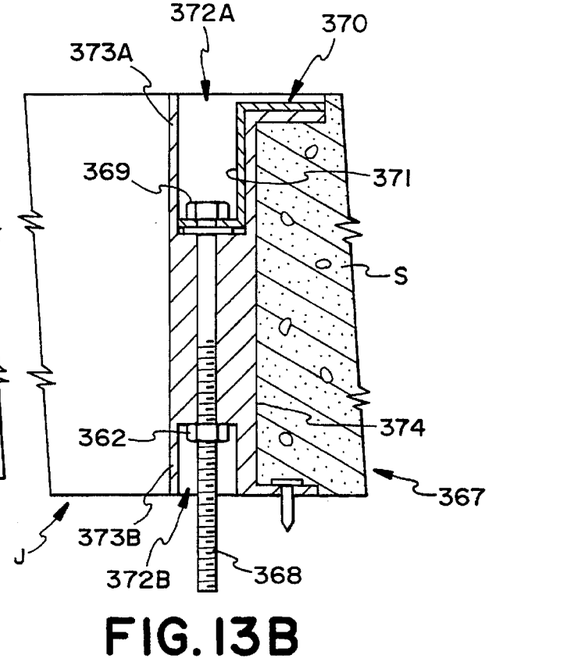
FIG. 13b is a partially sectioned elevational view of a yet still further preferred embodiment of an electrical fixture mounting assembly according to the invention.

FIG. 13b illustrates a still further preferred embodiment of an electrical fixture mounting assembly 367 according to the invention. Assembly 367 is similar to the embodiment of FIG. 13a, and includes a fastener 368 having a head 369, and which fastener 368 can be completely contained within the confines of assembly 367 during installation thereof.

A flange 370 is configured for transferring forces to surrounding concrete S, and a metal insert 371 is provided to further strengthen assembly 367, which may be made of various types of plastic and fiberglass reinforced plastics (FRP). A chamber 372a is defined, in part, by an upright extension 373a which may be integral with wall 374. Wall 374 and extension 373a define a junction box cavity J. A lower chamber 372b for receiving lock nut 362 and the free end of fastener 368, for example, is defined in a similar manner by an extension 373b.

When fasteners 368 are made of metal, chambers 372a and 372b are preferably made of plastic to satisfy current electrical code requirements for segregating-metal fasteners from junction box cavity J.

Figure 14:
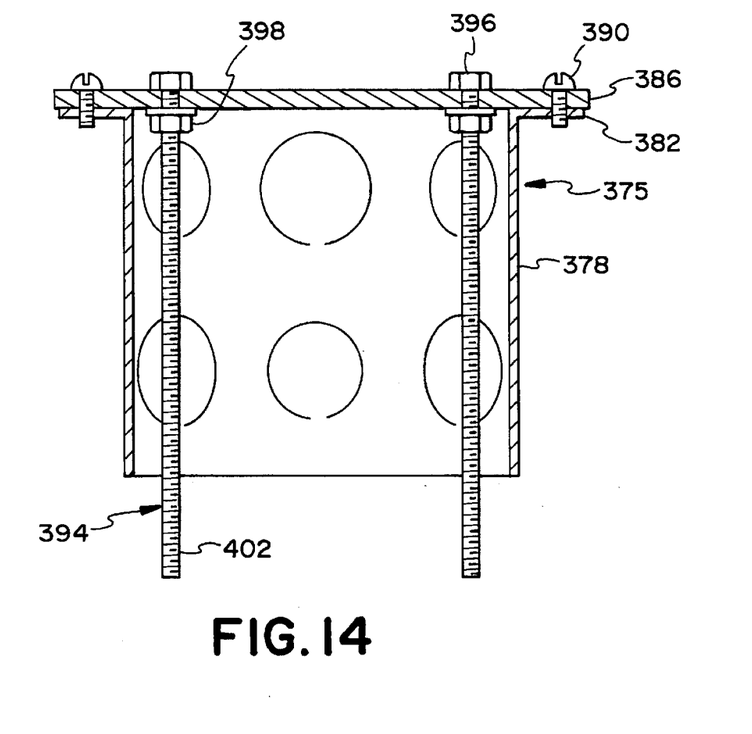
FIG. 14 is a partially sectioned elevational view of a further preferred embodiment of an electrical fixture mounting assembly according to the invention.

Turning to FIG. 14, a further preferred embodiment of an electrical fixture mounting assembly 375 according to the invention is shown.

Assembly 375 includes a wall 378 and one or more extensions 382 extending outwardly therefrom. A lid 386 is provided.

One or more optional fasteners 390 can be used to secure lid 386 to extension 382. One or more fixture fasteners 394 extend through lid 386 and are retained thereby, such as by engagement of a fastener head 396 with lid 386. Fasteners 394 extend past the bottom of wall 378 for engaging and supporting a fixture attached thereto, in a manner similar to the other preferred embodiments. A lock nut, lock washer and nut combination, and the like 398 is preferably used to fix fastener 394 relative to lid 386. By restricting movement of fastener 394, the attachment of a fixture at free ends 402 of fasteners 394 is made easier.

Figure 15:
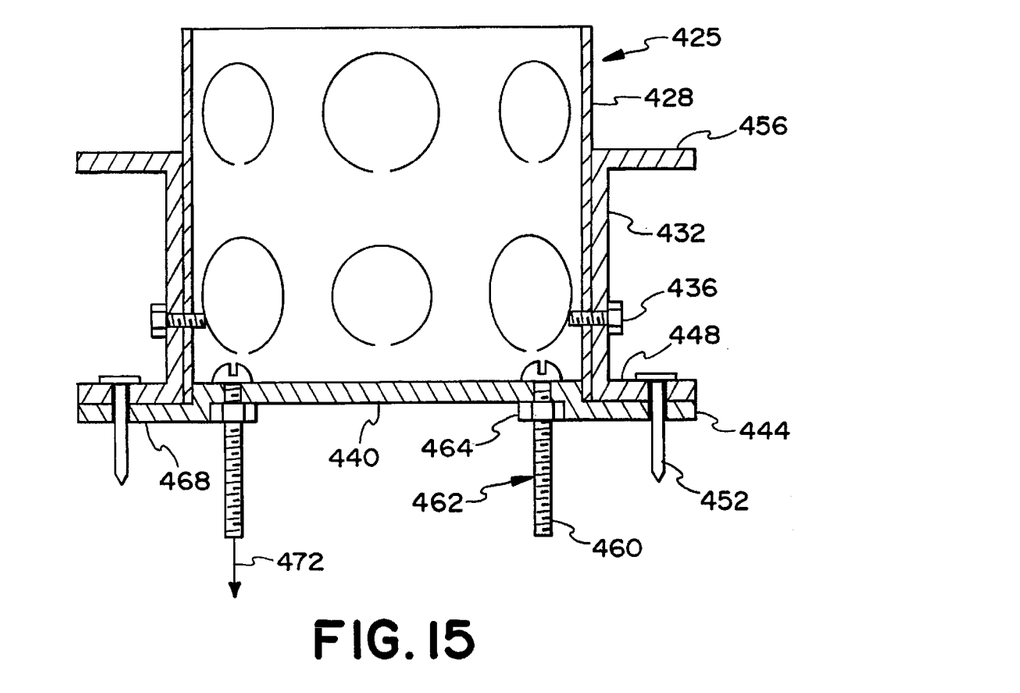
FIG. 15 is a partially sectioned elevational view of a still further preferred embodiment of an electrical fixture mounting assembly according to the invention.

Turning to FIG. 15, another preferred embodiment of an electrical fixture mounting assembly 425 according the invention is shown.

Assembly 425 includes a wall 428 defining a junction box cavity therein. A bracket 432 configured for engaging concrete is disposed adjacent wall 428. Preferably, bracket 432 is attached to wall 428, such as by a fastener 436. A fixture support bracket 440 having a lip or extension 444 is preferably disposed adjacent concrete bracket 432. A lower extension 448 on bracket 432 is conveniently provided with an aperture aligned with a corresponding aperture in extension 444, and through both of which a fastener 452 can be inserted for temporarily attaching electrical fixture mounting assembly 425 to concrete form work, for example.

An upper lip or extension 456 is provided on concrete bracket 432. Preferably, lip 456 extends transversely outwardly of wall 428 and is configured for engaging concrete when in use, lip 456 being configured for preventing removal of the junction box (i.e. entire electrical fixture mounting assembly 425) from the concrete when in use.

As will be appreciated, extension 456 will be configured and sized for engaging a sufficient amount of concrete to prevent movement of the junction box in the direction of the outward extension of a free end 460 of a fixture fastener 462. For example, when electrical fixture mounting assembly 425 is installed in a concrete ceiling, a lower face 468 of fixture support bracket 440 will be substantially aligned with the ceiling, and free end 460 will extend outwardly of the ceiling and of the assembly 425 into the associated room so that a fixture can be attached thereto. When electrical fixture mounting assembly 425 is mounted in a concrete ceiling, a force 472 exerted by such a fixture will be exerted on fasteners 462. The configuration and size of extension 456 will be one of the elements of electrical fixture mounting assembly 425 which counteracts force 472 and prevent force 472 from pulling assembly 425 out of the ceiling.

Conveniently, extension 456 is spaced from lower extensions 448 at a distance selected to allow for the user to readily access fastener 452 during installation. For example, in the case where fastener 452 is a standard nail, extension 456 will be sized and spaced appropriately from extension 448 to allow the use of a hammer to install fastener 452.

A lock nut 464 may be provided for preventing rotation of fastener 462 relative to fixture support bracket 440, to ease installation of a fixture as in the other preferred embodiments of the invention.

It is expected that concrete-engaging bracket 432 and fixture support bracket 440 will be made as an integral part, and will be fixedly or detachably attached to wall 428, depending on the intended use.

It will likewise be appreciated that the lower portion of wall 428 can be notched (i.e., a portion removed therefrom) for receiving fixture support bracket 440 so that the lower edges of wall 428 are substantially co-planar with lower face 468 so that both those surfaces engage concrete form work, when in use.

Figures 16A, 16B:
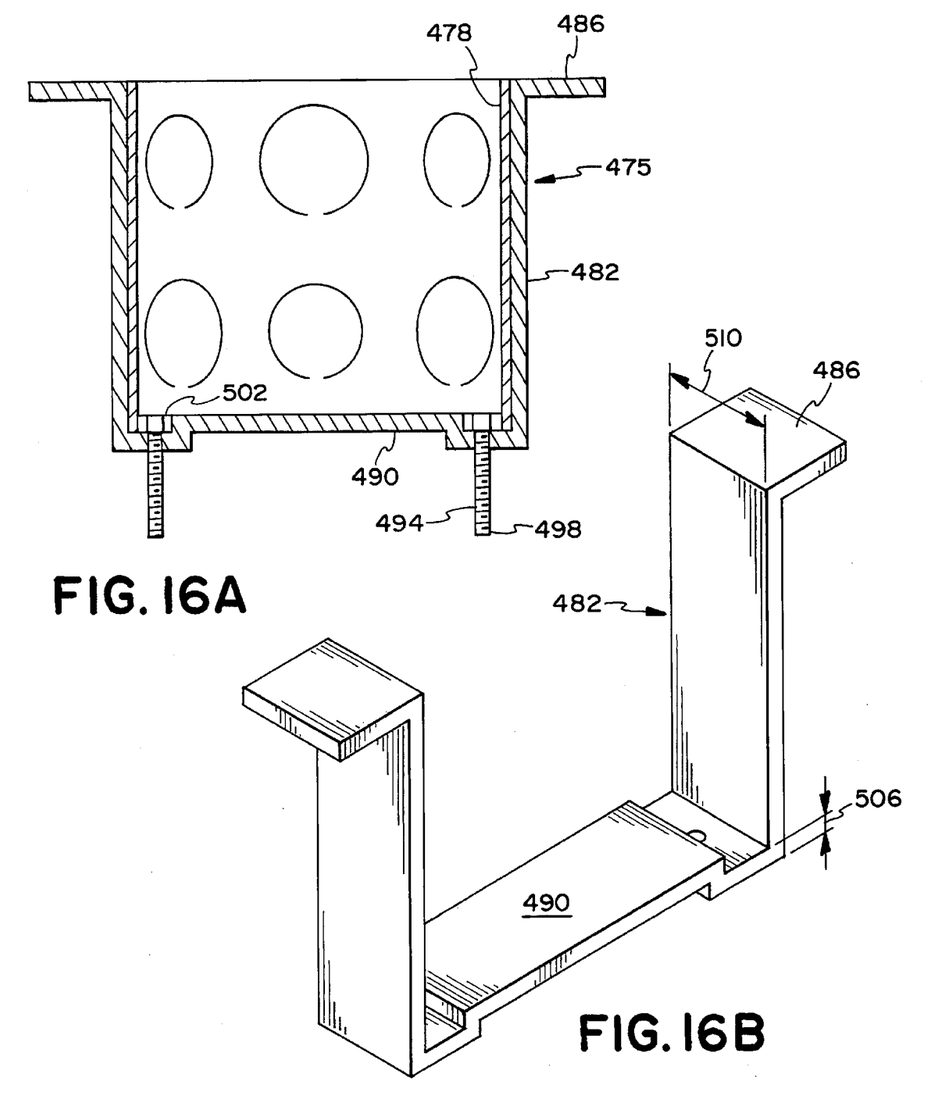

FIGS. 16a and 16b illustrate another preferred embodiment of an electrical fixture mounting assembly 475 according to the invention.

Assembly 475 includes a wall 478 defining a junction box therein. A unitary bracket 482 functions as both a concrete engaging element and a fixture supporting element. Bracket 482 includes a concrete engaging lip or extension 486 and a base 490. A fixture fastener 494 extends through lower portions 490.

In use, a free end 498 of fastener 494 extends outwardly of the junction box. Preferably, a head portion 502 of fastener 494 engages a portion of lower portion 490 for resisting rotation, when in use supporting a fixture. Alternatively, a lock nut can be used adjacent lower portion 490 for preventing rotation, in a manner similar to the embodiment of FIG. 13A, for example.

As illustrated, bracket 482 can be used with a conventional junction box. Conveniently, a lower portion of wall 478 can be removed for receiving bracket 482, as in the embodiment of FIG. 11, for example. Thus, a lower portion of wall 478 corresponding in height to thickness 506 of bracket 482, and having a width corresponding to a width 510 of bracket 482 will be removed from corresponding areas so that the remainder of wall 478 engages concrete form work when electrical fixture mounting assembly 475 is being installed.

Figure 17:
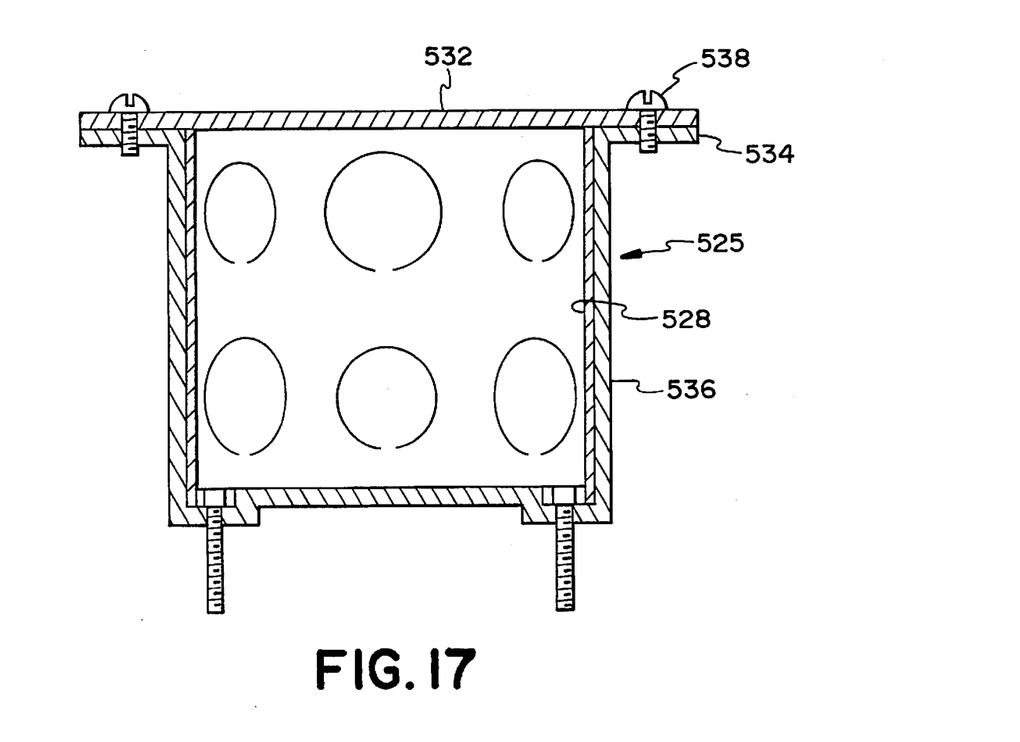
FIG. 17 is a partially sectioned elevational view of another preferred embodiment of an electrical fixture mounting assembly according to the invention.

Turning to FIG. 17, another preferred embodiment of an electrical fixture mounting assembly 525 according to the invention is shown. Mounting assembly 525 includes a wall 528 defining a junction box cavity therein.

This preferred embodiment is similar to the preferred embodiment of FIGS. 16a–16b, and includes a lid 532 which preferably encloses the junction box cavity. Lid 532 may be attached to a lip or extension 534 formed on a bracket 536 which may be secured to lid 532 by one or more fasteners 538. Bracket 536 may be substantially the same as bracket 482 of FIG. 16b, or may be configured to surround a lesser or greater relative portion of wall 528.

Figure 18A:
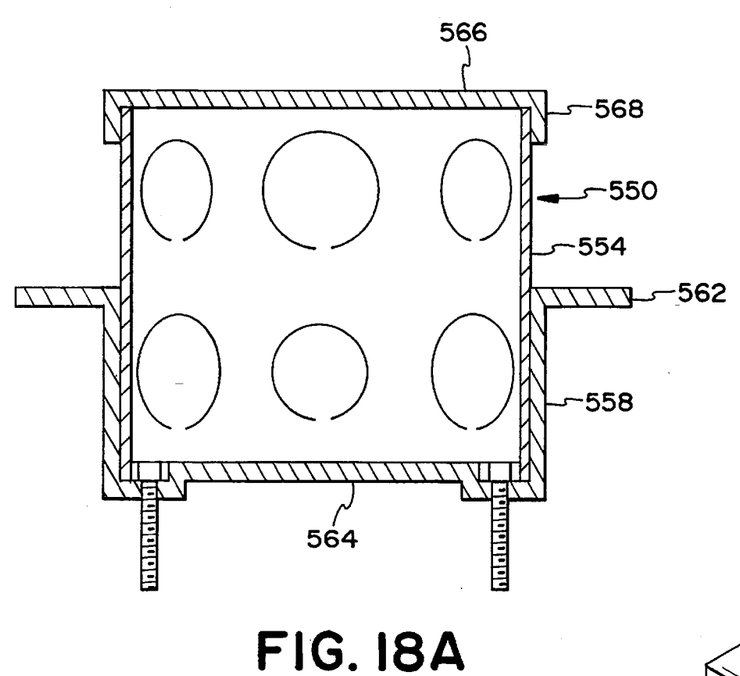
FIG. 18a is a partially sectioned view of a further preferred embodiment of an electrical fixture mounting assembly according to the invention.
Figure 18B:
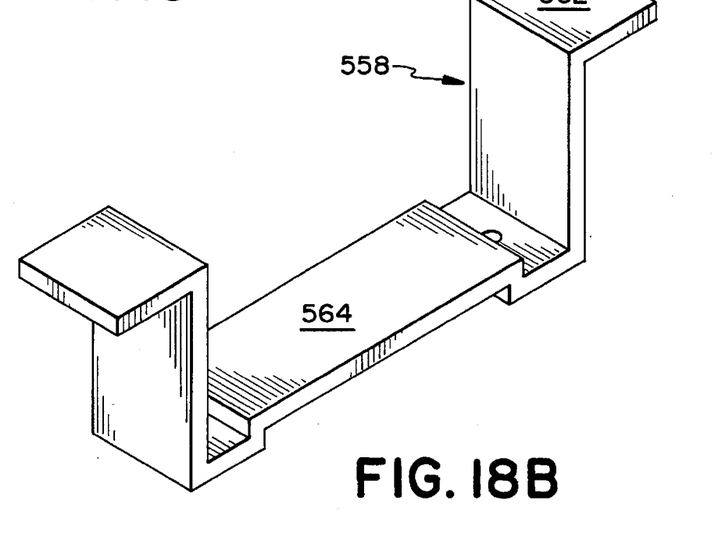

FIGS. 18a–18b illustrate a yet further preferred embodiment of an electrical fixture mounting assembly 550 according to the invention.

Assembly 550 is similar to the preferred embodiments of FIGS. 16a–17. Assembly 550 includes a wall 554 defining a junction box cavity therein. A bracket 558 includes a concrete engaging lip or extension 562. bracket 558 defines a lower fixture supporting base portion 564, similar to the embodiments of FIGS. 16a–17.

Preferably, a lid 566 engages an upper portion of wall 554 and covers the upper opening of the junction box. Lips 568 extend outwardly of lid 566 and retain lid 566 relative to walls 554. As in the earlier embodiments, it is contemplated that bracket 558 will be pressure fitted into engagement with wall 554 and/or attached thereto by fasteners, such as rivets.

Figure 19A:
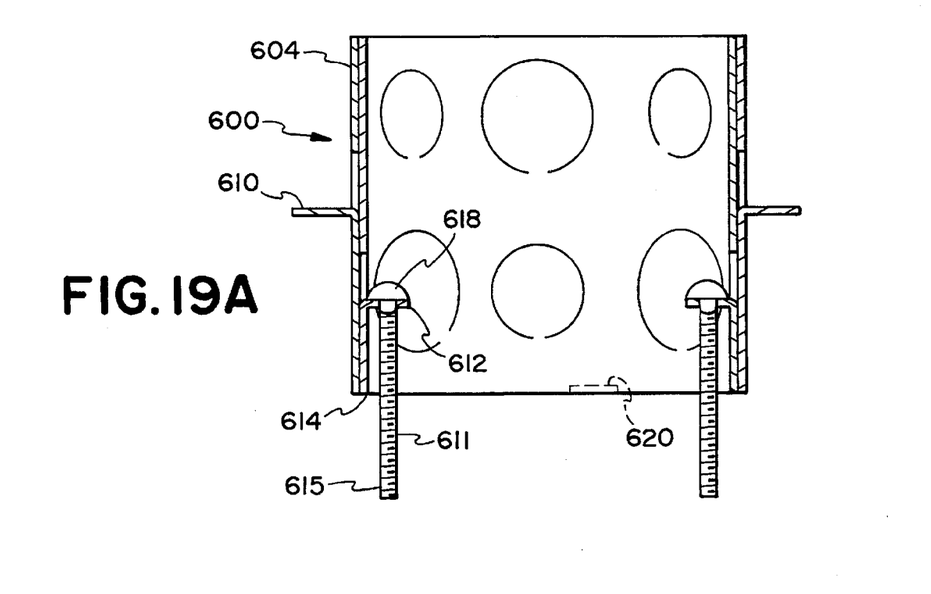
FIG. 19a is a partially sectioned elevational view of a yet still further preferred embodiment of an electrical fixture mounting assembly according to the invention.
Figure 19B:
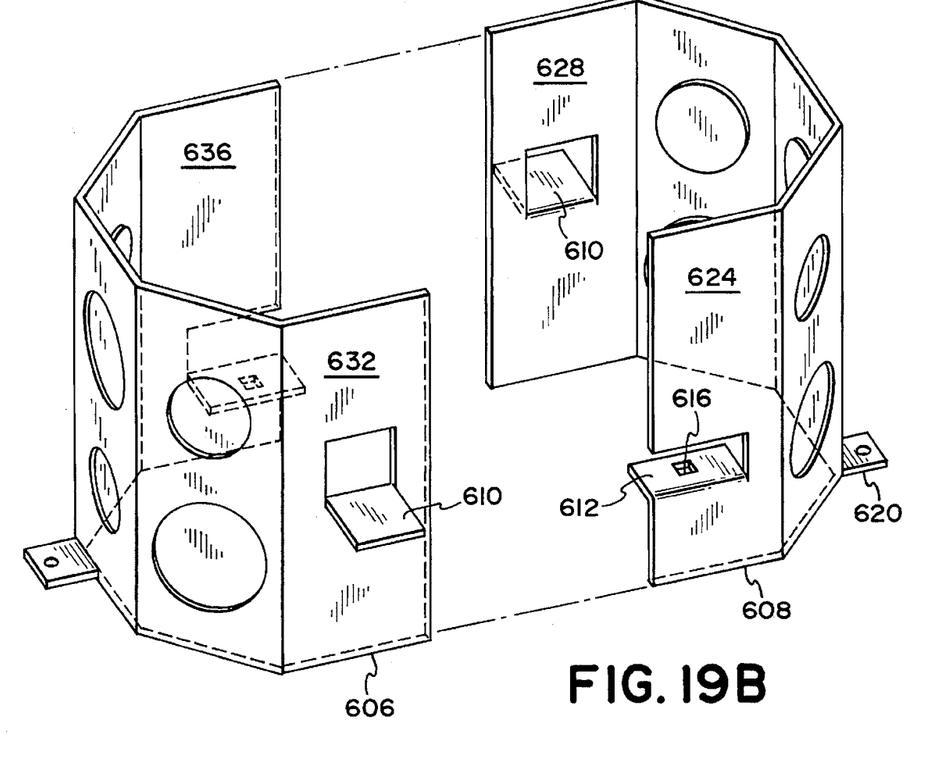

Turning to FIGS. 19a–19b, a further preferred embodiment of an electrical fixture mounting assembly 600 according to the invention is illustrated. Fixture mounting assembly 600 includes a wall 604. Conveniently, wall 604 may be made of a first half 606 and a second half 608. As will be readily appreciated from viewing FIG. 19b, first half 606 is conveniently made substantially identical to second half 608.

A concrete engaging tab 610 extends outwardly from wall 604. Concrete engaging tab 610 is configured and sized for engaging a sufficient amount of concrete, when installed, for resisting forces applied on fasteners 611 by attached fixtures, when in use, as in the other preferred embodiments.

Fasteners 611 are supported by fastener engaging extension 612. Extensions 612 are preferably spaced from a lower edge 614 of mounting assembly 600 so that fastener 611 can be retained within the enclosed volume of the junction box during installation (i.e., by having free end 615 of fastener 611 disposed between lower edge 614 and fastener engaging extension 612 during installation).

As in the preferred embodiment of FIG. 1, it is contemplated that holes 616 in fastener engaging extension 612 be configured for engaging fastener 611 when fasteners 611 are extended outwardly of the junction box, when in use, so as to prevent rotation of fastener 611 and to ease attachment of a fixture to fastener 611. For example, when fastener 611 are carriage bolts having a square neck portion adjacent heads 618 thereof, holes 616 will be configured as mating squares for preventing rotation thereof.

Preferably, first half 606 of wall 604 includes a first face 624 and an opposed face 628. Second half 608 includes a first face 632 and an opposed face 636. When assembled, face 632 overlaps face 624 and, in a like fashion, face 628 overlaps face 636. Fixture mounting assembly 600 is strengthened thereby and, in addition, as illustrated, the solid portion of face 624 overlaps the cutout in face 632 from which extension 610 was formed. Likewise, a solid portion of wall 606 overlaps the cutout portion from which extension 612 in face 624 is formed. Thus, the assembled electrical fixture mounting assembly 600 has no holes into which concrete would enter the junction box when being installed.

OPERATION

Electrical fixture mounting assembly 10 of the preferred embodiment of FIGS. 1–6 is installed and used as follows.

The end user, such as a builder or homeowner, lays down a support, such as plywood P in a conventional manner that is sufficiently strong to support a ceiling/floor of a substrate S, for example, concrete.

In the case where junction box 14 will be embedded in the ceiling of a structure, a lower portion of concrete S will define the ceiling C, and an upper surface thereof will define a floor F of the room above, as will be readily understood.

The user places fixture mounting assembly 10 in the desired location, and secures mounting assembly 10 in place by fixing temporary tie down tab 110 relative to plywood P by use of fastener 184. Typically, both temporary tie down tabs 110 will be secured. Bottom 18 of junction box 14 will abut plywood P, and generally no seal is required therebetween.

Lid 54 is secured to top 16 of junction box 14 by fasteners 66 and 68. Conveniently, a seal, such as foam gasket 56 is disposed between lid 54 and top 16 for preventing entry of water and concrete S during the pouring and curing thereof.

Substrate S, such as concrete, is then filled in on top of plywood P and around electrical fixture mounting assembly 10. Depending on local practice or the final intended use of junction box 14, the concrete will either completely entomb electrical fixture mounting assembly 10, or an indentation I within the concrete will be formed substantially above lid 54.

After the concrete has cured, plywood P is removed, and fasteners 184 are typically likewise removed.

Figure 3:
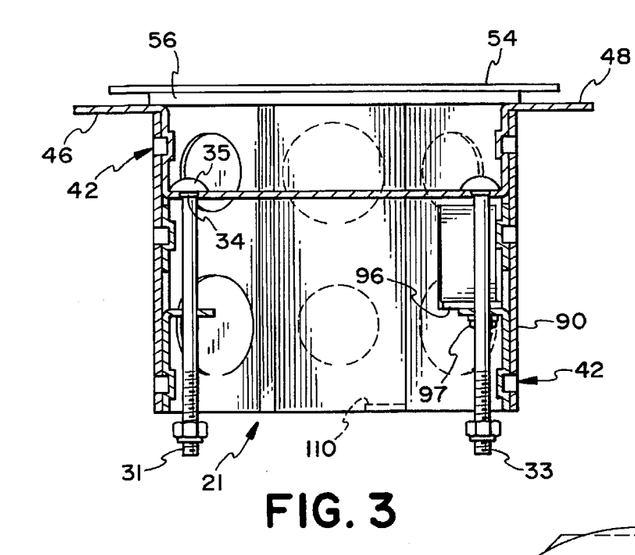
FIG. 3 is a side elevational view, partially in section, of the electrical fixture mounting assembly of the preferred embodiment of FIG. 1.
Figure 4:
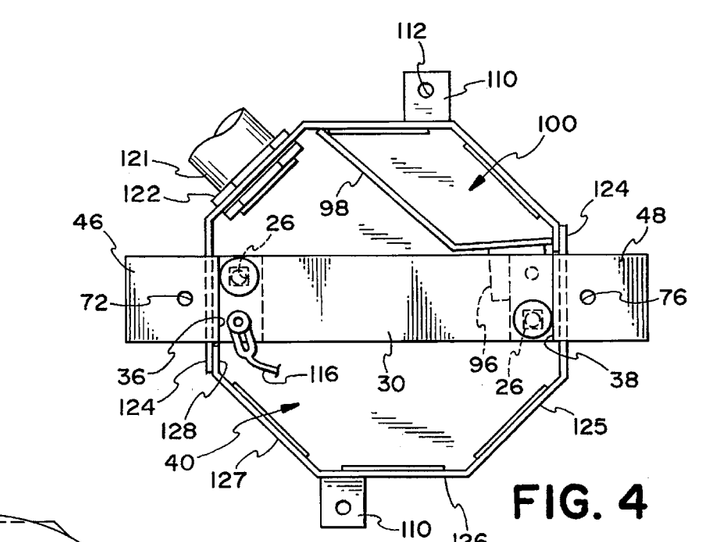
FIG. 4 is a top view of the preferred embodiment of the electrical fixture mounting assembly of FIG. 1.
Figure 5:
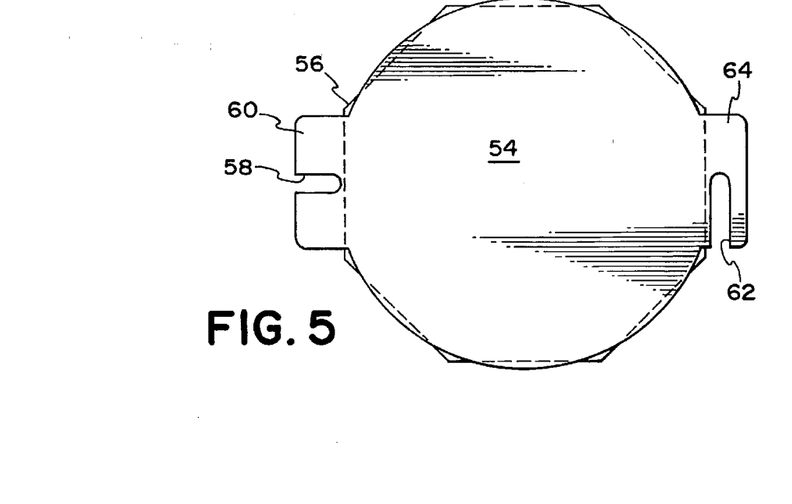
FIG. 5 is a plan view of a cover member for use with the preferred embodiment of the electrical fixture mounting assembly of FIG. 1, as installed.

Fasteners 31 and 33 are then moved downwardly and outwardly from their retracted positions (FIG. 6) to their extended positions (FIGS. 1, 3, and 9). In the case where two fasteners 31 and 33 are used, a transversely extending member, such as a rubber band R is used for biasing fasteners 31 and 33 slightly toward each other with sufficient force to maintain them in the retracted position. Preferably, rubber band R is attached at lower portions of fasteners 31 and 33, so that rubber band R can be removed from below by the user. It is likewise contemplated that no rubber band R be used, and the lower ends of fastener 31 and 33 will abut plywood P when concrete is being poured.

One or more pieces of conduit 121 (FIG. 4, omitted from FIGS. 6 and 9 for clarity) will have wires and cables extended therethrough, if such were not inserted at the time the conduit was installed, as is typical.

Auxiliary junction box 150 will typically be attached when there is a need for surface wiring along ceiling C and down an adjoining wall of a room, for example. In that case, one or more of knock-outs 153 would be removed, standard conduit attached, and wiring run.

The attachment of certain fixtures will necessitate the removal of knock-out 158 from cover 154, and the appropriate wire/communication lines run to an added-on fixture.

With the installation of typical ceiling fans, for example, auxiliary junction box 150 will not be used. The ceiling fan or other electrical appliance will be attached directly to electrical fixture mounting assembly 10 by use of one or both of fasteners 31 and 33.

Most ceiling fans, which exert relatively high loads and vibrations, will use both fasteners 31 and 33 at the same time.

Thanks to the novel structure of the invention, all such static and dynamic forces will be transferred directly from the mounted electrical appliance through fasteners 31 and 33, and then directly into the supporting ceiling C (i.e., substrate S, such as concrete). More specifically, the forces transmitted through fasteners 31 and 33 will be directed through transverse support 30, through vertical extensions 36, and then through extensions 46 and 48.

It will be noted that additional strength (i.e., resistance to the forces applied through bolts 31 and 33) will be provided by the feature that lid 54 overlaps and extends outwardly of sidewall 20. This structural feature which further reduces the likelihood of junction box 14 being loosened relative to substrate S, or even in extreme circumstances being completely pulled out of substrate S, can be appreciated from viewing FIGS. 3, 5, and 6.

It is further contemplated that the electrical fixture mounting assembly will be made of materials other than a galvanized steel, such as plastics, and the like.

It should be understood that the location of extensions 46 and 48 near top 16 of junction box 14 is merely one example of a means for carrying out my invention. It is likewise contemplated that extensions 46 and 48 will be located at any different position between top 16 and bottom 18 depending on the intended use, and on manufacturing constraints. It is also expected that the number of extensions will be varied, depending on the intended use, of electrical fixture mounting assembly 10.

Likewise, it is contemplated that the size, configuration, and location of transverse support 30, for example will be varied as required.

It is further contemplated that the inwardly extending fastener guides on the auxiliary junction box will likewise be varied in height, number, and location, depending on the intended use, and manufacturing requirements. For example, it is contemplated that the fastener guides will be located spaced from the top of the auxiliary junction box, so that they can be stamped out of the subpanels of the sidewall thereof in a manner analogous to the formation of auxiliary bracket 90 of junction box 14.

While this invention has been described as having a preferred design, it is understood that it is capable of further modifications, uses and/or adaptations of the invention following in general the principle of the invention and including such departures from the present disclosure as come within the known or customary practice in the art to which to invention pertains and as may be applied to the central features hereinbefore set forth, and fall within the scope of the invention and of the limits of the appended claims.

What is claimed is:

1. An electrical fixture mounting assembly comprising:
   a) a junction box having a top and a bottom;
   b) said junction box having a side wall defining a junction box cavity therein;
   c) a mounting bracket disposed adjacent said junction box;
   d) a fastener attachment site disposed on said mounting bracket;
   e) a fastener disposed on said fastener attachment site, said fastener being movable between an extended position and a retracted position, said fastener being movable a first distance to extend outwardly past said bottom of said junction box when said fastener is in said extended position, and said fastener being retracted said first distance and disposed substantially above said bottom of said junction box cavity when said fastener is in said retracted position;
   f) said fastener attachment site being located a second distance away from said top of said junction box toward said bottom of said junction box; and
   g) said second distance being sufficiently long to provide for said fastener being moved said first distance into said retracted position without protruding above said top of said junction box.

2. An electrical fixture mounting assembly as defined in claim 1, wherein:
   a) at least one extension is provided on said mounting bracket, said at least one extension being disposed at least partially outwardly of said side wall.

3. An electrical fixture mounting assembly as defined in claim 1, wherein:
   a) said fastener attachment site is configured for substantially preventing rotation of said fastener when said fastener is in said extended position.

4. An electrical fixture mounting assembly as defined in claim 3, wherein:
   a) said fastener attachment site is configured for allowing rotation of said fastener when said fastener is in said retracted position.

5. An electrical fixture mounting assembly as defined in claim 1, wherein:
   a) a second fastener attachment site is provided on said mounting bracket; and
   b) said second attachment site is spaced apart from said fastener attachment site.

6. An electrical fixture mounting assembly as defined in claim 5, wherein:
   a) a second fastener is disposed at said second fastener attachment site.

7. An electrical fixture mounting assembly as defined in claim 6, wherein:
   a) said second fastener is movable between an extended position and a retracted position, said second fastener is sufficiently long to extend outwardly of said junction box cavity when said fastener is in said extended position, and said second fastener is disposed substantially within said junction box cavity when said fastener is in said retracted position.

8. An electrical fixture mounting assembly as defined in claim 1, wherein:
   a) an interior wall is provided in said junction box, and said interior wall defines an auxiliary cavity.

9. An electrical fixture mounting assembly as defined in claim 8, wherein:
   a) an auxiliary access hole is provided in said side wall adjacent said auxiliary cavity.

10. An electrical fixture mounting assembly as defined in claim 1, wherein:
    a) a supplemental bracket is provided in said junction box cavity; and b) said supplemental bracket is spaced from said fastener attachment site and engages said fastener when said fastener is in said extended position.

11. An electrical fixture mounting assembly as defined in claim 10, wherein:

a) said supplemental bracket is configured for engaging said fastener when said fastener is in its retracted position.

12. An electrical fixture mounting assembly as defined in claim 1, wherein:

a) said mounting bracket is disposed adjacent said top of said junction box.

13. An electrical fixture mounting assembly as defined in claim 12, wherein:

a) at least one attachment bracket is provided adjacent said bottom of said junction box.

14. An electrical fixture mounting assembly as defined in claim 1, wherein:

a) a supplemental junction box is provided at said bottom of said junction box.

15. An electrical fixture mounting assembly as defined in claim 1, wherein:

a) a cover is provided on said top of said box, and said cover extends at least partially outwardly of said side wall.

16. An electrical fixture mounting assembly as defined in claim 1, wherein:

a) said fastener attachment site is disposed within said junction box cavity.

17. A method of installing an electrical fixture mounting assembly in concrete, said method comprising:

a) providing a junction box having a top, a bottom, a sidewall extending therebetween, and a junction box cavity therein;

b) providing a mounting bracket having a fastener attachment site thereon;

c) providing a fastener disposed on said fastener attachment site, said fastener being movable between an extended position and a retracted position, said fastener extending outwardly past the bottom of said junction box when said fastener is in said extended position, and said fastener being disposed substantially above the bottom of said junction box when said fastener is in said retracted position;

d) providing a piece of concrete form work;

e) placing said junction box on the piece of formwork provided in the previous step for pushing said fastener into its retracted position.

18. A method of installing an electrical fixture mounting assembly in concrete as in claim 17, further comprising the step of:

a) providing an auxiliary junction box configured for being attached to said junction box.

19. An electrical fixture mounting assembly as defined in claim 1, wherein:

a) said mounting bracket is disposed adjacent said bottom of said junction box.

20. An electrical fixture mounting assembly as defined in claim 1, wherein:

a) said junction box includes a lid disposed on one of said top and bottom of said junction box.

21. An electrical fixture mounting assembly as defined in claim 1, wherein:

a) said mounting bracket extends outwardly of said side wall.

22. An electrical fixture mounting assembly as defined in claim 21, wherein:

a) said mounting bracket is integral with said side wall.

23. An electrical fixture mounting assembly as defined in claim 1, wherein:

a) said fastener attachment site is located inwardly of said side wall.

24. An electrical fixture mounting assembly as defined in claim 1 wherein:

a) said fastener attachment site is integral with said side wall.

25. An electrical fixture mounting assembly comprising:

a) a junction box having a top and a bottom;

b) said junction box having a side wall defining a junction box cavity therein;

c) a lip disposed adjacent said junction box;

d) said lip extending transversely outwardly of said junction box, said lip being configured for engaging concrete when in use, and said lip being configured for preventing removal of said junction box from concrete when in use;

e) a fastener attachment site adjacent said junction box; and f) a fastener disposed on said fastener attachment site, said fastener being movable between an extended position and a retracted position, said fastener being movable a first distance to extend outwardly of said bottom of said junction box when said fastener is in said extended position, and said fastener being retracted said first distance and contained substantially above said bottom of said junction box when said fastener is in said retracted position;

f) said fastener attachment site being located a second distance away from said top of said junction box toward said bottom of said junction box; and g) said second distance being sufficiently long for providing for said fastener being moved said first distance into said retracted position without protruding above said top of said junction box.

26. An electrical fixture mounting assembly as defined in claim 25, wherein:

a) said fastener being contained substantially within said junction box cavity when said fastener is in said retracted position.

27. An electrical fixture mounting assembly as defined in claim 25, wherein a) said lip is configured for preventing movement of said junction box in the direction of the outward extension of the said fastener in its extended position.

28. An electrical fixture mounting assembly as defined in claim 25, wherein:

a) said fastener extends said first distance outwardly of said junction box cavity when in said extended position, and is disposed substantially within said junction box when in said retracted position.

29. An electrical fixture mounting assembly as defined in claim 1, wherein:

a) said fastener extends said first distance outwardly of said junction box cavity when in said extended position, and is disposed substantially within said junction box when in said retracted position.

30. A method of installing an electrical fixture mounting assembly in concrete as in claim 17, further comprising the step of:

a) pouring concrete around said junction box.

* * * * *